(12) United States Patent
Rajavi et al.

(10) Patent No.: US 11,838,068 B2
(45) Date of Patent: *Dec. 5, 2023

(54) TRANSCEIVER WITH SHARED FILTER FOR BOTH TRANSMIT AND RECEIVE MODES

(71) Applicant: Apple Inc., Cupertino, CA (US)

(72) Inventors: Yashar Rajavi, San Jose, CA (US); Sohrab Emami-Neyestanak, San Francisco, CA (US); Abbas Komijani, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,332

(22) Filed: Jun. 30, 2022

(65) Prior Publication Data

US 2022/0407560 A1 Dec. 22, 2022

Related U.S. Application Data

(63) Continuation of application No. 16/953,244, filed on Nov. 19, 2020, now Pat. No. 11,381,279.

(51) Int. Cl.
*H04B 3/21* (2006.01)
*H04B 3/04* (2006.01)
(Continued)

(52) U.S. Cl.
CPC ............... *H04B 3/21* (2013.01); *H04B 3/04* (2013.01); *H04B 3/50* (2013.01); *H04B 15/00* (2013.01)

(58) Field of Classification Search
CPC ... H04B 3/21; H04B 3/04; H04B 3/50; H04B 15/00; H04B 1/38; H04L 5/16
See application file for complete search history.

(56) References Cited

U.S. PATENT DOCUMENTS 5,694,439 A * 12/1997 Doyle .................. H03H 7/1766
375/350
2009/0278609 A1 11/2009 Srinivasan et al.
(Continued)

FOREIGN PATENT DOCUMENTS

EP 1826914 8/2007
EP 2017966 1/2009

OTHER PUBLICATIONS

Kokubo et al., ISSCC 2002 / Sesseion 5 / Wireless Networking Transceivers / 5.5 A 2.4GHZ RF Transceiver with Digital Channel-Selection Filter for Bluetooth; 2002 IEEE International Solid-State Circuits Conference; 0-7803-7335-9, 3 pages.

(Continued)

*Primary Examiner* — David S Huang
(74) *Attorney, Agent, or Firm* — Kowert, Hood, Munyon, Rankin & Goetzel, P.C.; Erik A. Heter; Dean M. Munyon (57) ABSTRACT

A transceiver having a shared filter for both transmit and receive modes is disclosed. A transceiver includes a transmitter having an output coupled to a signal node, wherein the transmitter is configured to transmit signals onto the signal node during transceiver operation in a transmit mode. The transceiver also includes a receiver having an input coupled to the signal node, and configured to receive signals from the signal node during operation in the receive mode. The transceiver further includes a first filter coupled to the signal node, wherein the filter is shared by the transmitter and the receiver. The filter is coupled between the transceiver and a first terminal of a transmission line.

20 Claims, 6 Drawing Sheets

(51) Int. Cl.
    *H04B 3/50*     (2006.01)
    *H04B 15/00*     (2006.01)

(56) References Cited

U.S. PATENT DOCUMENTS

| | | |
|---|---|---|
| 2010/0297961 A1 | 11/2010 | Chien |
| 2014/0153620 A1 | 6/2014 | Longo et al. |
| 2017/0063425 A1 | 3/2017 | Khlat et al. |
| 2020/0036408 A1 | 1/2020 | Jhang Jian |
| 2020/0212943 A1* | 7/2020 | Banin .................. H04L 1/1607 |

OTHER PUBLICATIONS

Bhuiyan et al., "A Review On CMOS GM-C Band Pass Filters in RF Application," Journal of Theoretical and Applied Information Technology Mar. 10, 2014. vol. 61 No. 1, pp. 17-23.
International Search Report and Written Opinion in PCT Appl. No. PCT/US2021/059471 dated Feb. 28, 2022, 11 pages.

* cited by examiner

TRANSCEIVER WITH SHARED FILTER FOR BOTH TRANSMIT AND RECEIVE MODES

The present application is a continuation of U.S. application Ser. No. 16/953,244, entitled "Transceiver with Shared Filter for both Transmit and Receive Modes," filed Nov. 19, 2020, the disclosure of which is incorporated by reference herein in its entirety.

BACKGROUND

Technical Field

This disclosure is directed to electronic circuits, and more particularly, transceiver circuits used to transmit and receive signals in electronic systems.

Description of the Related Art

Many integrated circuits, such as processor, utilize high-speed communications links, both on-chip was well as inter-chip. One popular type of high-speed communications link is a bi-directional serial link in which SERDES (serializer-deserializer) transceivers are implemented at both ends. At the transmission end, a SERDES transceiver may receive data in parallel, serialize the data, and transmit it at high speeds over the link. At the receiving end, a SERDES transceiver may receive the serially-transmitted data, de-serialize the data into parallel, and convey the data towards its eventual destination.

Since a SERDES-based communications link is a high-speed link, they can at times produce high frequency emissions that interfere with other circuits. Similarly, high frequency noise can affect received serial data, causing bit errors that affect the integrity of the data that is to be deserialized. To this end, typical SERDES transceivers may implement filters for each of the transmit and receive functions. A first filter, exclusive to the transmitter portion of a SERDES transceiver, may filter out high frequency noise prior to the data signal being transmitted over a signal path. A second filter, exclusive to the receiver portion of the SERDES transceiver, may filter out external interference that could otherwise corrupt the incoming data.

SUMMARY

A transceiver having a shared filter for both transmit and receive modes is disclosed. In one embodiment, a transceiver includes a transmitter having an output coupled to a signal node, wherein the transmitter is configured to transmit signals onto the signal node during transceiver operation in a transmit mode. The transceiver also includes a receiver having an input coupled to the signal node, and configured to receive signals from the signal node during operation in the receive mode. The transceiver further includes a first filter coupled to the signal node, wherein the filter is shared by the transmitter and the receiver. The filter is coupled between the transceiver and a first terminal of a transmission line.

In one embodiment, the filter is an $N^{th}$ order passive filter, where N is an integer value. The filter may further be an LC (inductive-capacitive filter) having one or more inductors and one or more capacitors. In one embodiment, the filter provides resistive termination of the transmission line, and the inductors may choses such that their resistance values provide the desired termination.

In some embodiments, the transceiver is a single-ended transceiver, while the disclosure further contemplates differential transceivers with a corresponding filter for each of the differential transmission lines. The transceiver may be part of a communications link, which may be a serial communications line. The transceiver may further be included as part of a SERDES (serializer-deserializer) communications link.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to a transceiver that utilizes a shared filter for both transmit and receive modes. Typically, a transmitter and a receiver in a transceiver utilize separate and distinct filters. On the transmit side, it is undesirable to create any interference with outgoing transmissions (e.g., low emission during transmit operations). On the receiver side, it is desirable to prevent outside interference affecting incoming signals (e.g., blocker tolerant during receive operations). Since the transmitter and receiver share the same transmission line, correctly terminating a correspondingly coupled transmission line can be difficult. For these reasons, transceivers employ separate filters for the transmitter and receiver, with separate termination.

The present disclosure is directed to a transceiver in which a single filter is shared by the transmitter and receiver, with no separate, distinct filters for each. In one embodiment, the shared filter may be a passive LC (inductive-capacitive) filter. The inductors may be chosen in part based on their resistance. By choosing the resistance properly, a transmission line may be properly terminated for both the transmitter and receiver. Furthermore, the shared filter may provide a reciprocal response (e.g., the same frequency response) in both the transmit and receive modes. Thus, the shared filter may prevent the transmitter from creating interference with other circuits on outgoing transmissions, while preventing an incoming signal from being affected by external interference. The use of a single, shared filter may simplify the design and allow implementation of the same with fewer components. The use of fewer components may, in turn, result in less area being consumed for the implementation of filtering for the transmitter and receiver.

The transceivers of the present disclosure and the circuitry in which they are implemented in may include both single-ended and differential embodiments. These transceivers may thus be used in, e.g., in communications systems that utilize serial transmission of data.

Various embodiments of a transceiver and its arrangement in a communications link are now discussed, followed by an example of a communications link in which it may be implemented. Discussion of a method for operating an embodiment of a transceiver in accordance with this disclosure follows, with the description concluding with an example system in which communications links utilizing the circuitry of the present disclosure are implemented.

Figure 1:
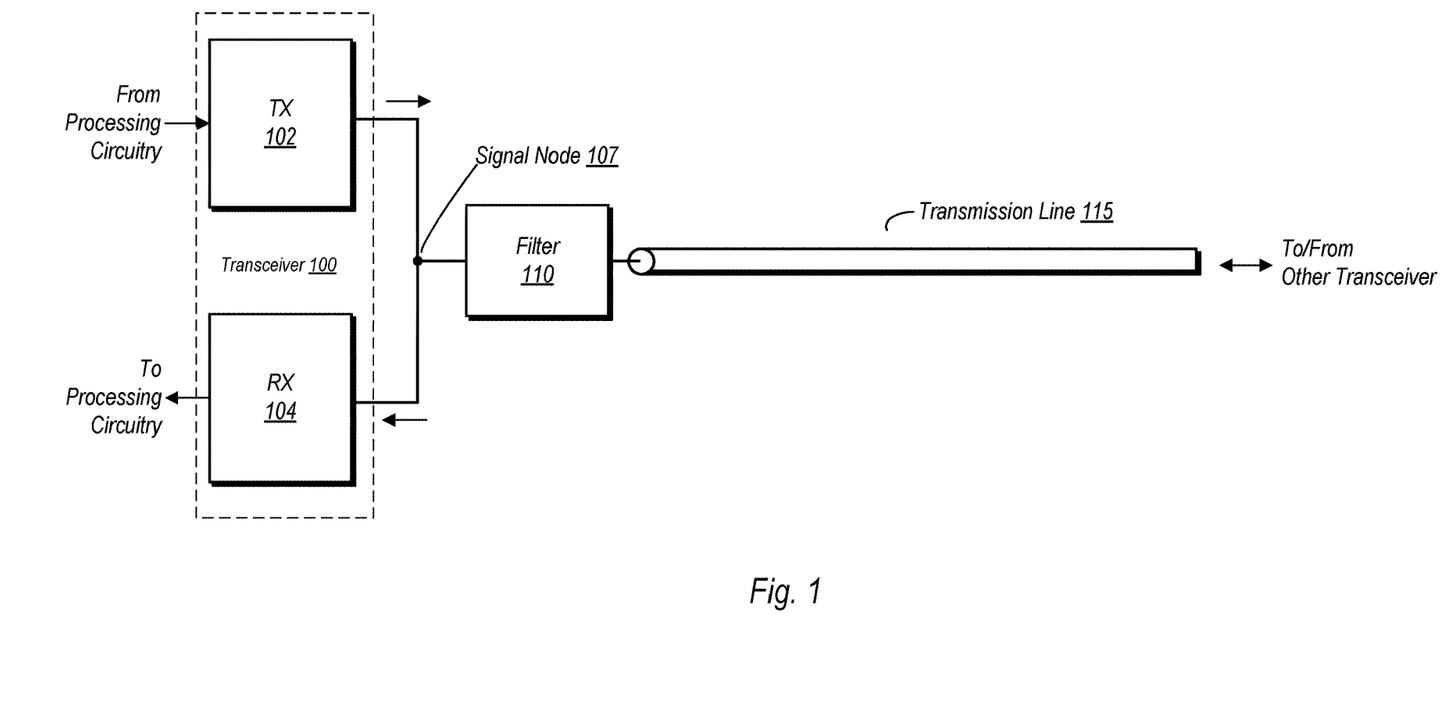
FIG. 1 is a block diagram of one embodiment of a transceiver in a communications link.

Transceiver Embodiments with Shared Filter:

FIG. 1 is a block diagram of one embodiment of a transceiver in a communications link. In the embodiment shown, transceiver 100 includes a transmitter 102 and a receiver 104. Transmitter 102 in the embodiment shown may receive data to be transmitted from other processing circuitry. Receiver 104 in the embodiment shown may convey received data to the processing circuitry. The processing circuitry may be any type of circuitry in which data undergoes some sort of processing or conversion. The data received by transmitter 102 may be in a format suitable for transmission. The data may be received in the same format, by receiver 104, before being conveyed to the processing circuitry.

Both transmitter 102 and receiver 104 are coupled to a signal node 107. More particularly, an output of transmitter 102 is directly coupled to signal node 107, while similarly, an input node of receiver 104 is directly coupled signal node 107. As used herein, the term "directly coupled" may be defined as the transmitter output and receiver input being coupled to signal node 107 with no intervening circuitry (e.g., another filter that is arranged to operate exclusively on signals of one of transmitter 102 or receiver 104).

Filter 110 in the embodiment shown is coupled between signal node 107 and a transmission line 115. Filter 110 may provide a number of different functions. When transceiver 100 is operating in a transmit mode (e.g., transmitter 102 transmitting data), filter 110 may reject electromagnetic interference that may otherwise be created by the transmission of data. When transceiver 100 is operating in a receive mode (e.g., receiver 104 is receiving data transmitted by another transmitter), filter 110 may reject interference caused by external sources. The response of filter 110 in various embodiments may be reciprocal, e.g., may provide the same frequency response for signals transmitted by transmitter 102 and received by receiver 104.

In addition to rejecting interference, filter 110 may also provide termination of transmission line 115. As would be recognized by a skilled practitioner, termination is the practice of ending a transmission line with circuitry that matches the characteristic impedance of the transmission line so as to prevent undesired effects such as signal reflections. As will be discussed below, one embodiment of filter 110 may utilize inductors arranged to provide a DC resistance that is equal to the characteristic impedance of transmission line 115. However, the present disclosure is not limited to such a filter, and virtually any type arranged to provide the desired termination may be utilized.

Transmission line 115 may be any suitable type of transmission medium, such as a coaxial transmission line, stripline, microstrip, waveguide, or even a simple wire. Another transceiver arranged in the same or a similar manner to transceiver 100 may be coupled to transmission line 115. Furthermore, the other end of transmission line 115 may be terminated with a filter similar or the same as that of filter 110, which may also operate on the same principle.

Figure 2:
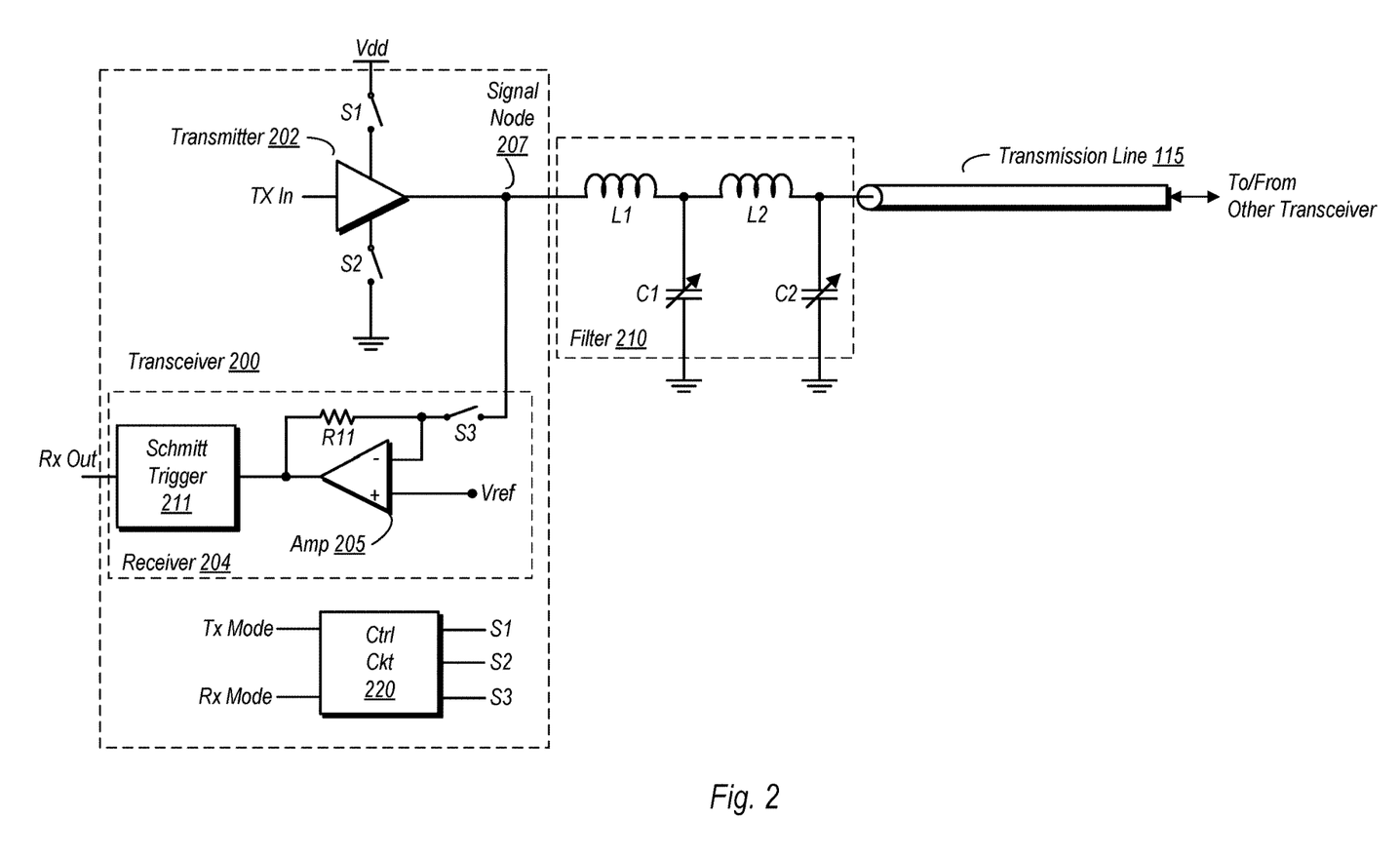
FIG. 2 is a schematic diagram of one embodiment of a transceiver.

FIG. 2 is a schematic diagram of one embodiment of a transceiver. In the embodiment shown, transceiver 200 is a single-ended transceiver, including a transmitter 202 and a receiver 204. Furthermore, transceiver 200 is arranged for the transmission and reception of serial data. The rate at which data is transmitted and received may be controlled by other circuitry (e.g., processing circuitry) not shown here. A filter 210 is coupled between transceiver 200 (and more particularly, signal node 207 of transceiver 200) and transmission line 115. Although not explicitly shown here, a second transceiver arranged in the same manner as transceiver 200 may be coupled to receive signals from and transmit signals to the instance of a transceiver shown here. Furthermore, a filter similar to or the same as filter 210 may be coupled between the other transceiver and transmission line 115.

Transceiver 200 in the embodiment shown includes a control circuit 220 that may control the operational mode. In the embodiment shown, control circuit 220 is coupled to receive transmit mode ('Tx Mode') and receive mode ('Rx Mode') signals. Operation in the transmit mode, with transceiver 200 transmitting signal, may be carried out when the transmit mode signal is asserted. Operation in the receive mode may be carried out by transceiver 200 when the receive mode signal is asserted. These signals may be asserted exclusive of one another. Control circuit 220 may cause transceiver to operate in the selected mode by controlling the states of the various switches, as will be discussed below. The present disclosure also contemplates a third, idle mode, in which neither the transmit nor receive mode signals are asserted.

Transmitter 202 in the embodiment shown is implemented as a buffer/driver circuit configured to drive data onto signal node 207 in accordance with the data received on its input ('Tx In'). Generally speaking, transmitter 202 may be implemented using and suitable type of circuitry capable of driving signals at the desired rate. Operation in the transmit mode may be enabled by control circuit 220 by the causing the closure of switches S1 and S2. The closing of switch S1 coupled transmitter 202 in the illustrated embodiment coupled transmitter 202 to a supply voltage Vdd. Meanwhile, the closing of switch S2 coupled transmitter 202 to ground. Thus, when these two switches, S1 and S2 are closed, transmitter 202 is fully powered on and enabled for transmitting data received on its input. The rate at which data is transmitted may be dependent upon the rate at which data is received by transmitter 202. The data transmitted by transmitter 202 is driven onto signal node 207, through filter 210, onto transmission line 115, and to another instance of a transceiver coupled to the opposite end.

Receiver 204 in the embodiment shown includes a number of components. An input to receiver 204 is coupled to a terminal of switch S3, which is also coupled to signal node 207. The other terminal of switch S3 is coupled to an inverting input of amplifier 205 and a terminal of resistor R11. The non-inverting input of amplifier 205 is coupled to receive a reference voltage, which may be generated by any suitable voltage generation circuitry (e.g., a bandgap circuit; not shown). The output of amplifier 205 (and other terminal of R11) is coupled to, in this embodiment, a Schmitt trigger 211, the output of which is provided as the receiver output. Transceiver 200 may operate in the receive mode when switch S3 is closed. Data received on the signal node 207 may be provided to the inverting input of amplifier 203, via S3. Amplifier 205 may produce an output signal corresponding to the received data, which is provided to Schmitt trigger 211 and eventually to other circuitry from the output of the latter.

As noted above, control circuit 220 includes a control circuit configured to set the mode of operation according to mode signals received from an source external to transceiver 200 (e.g., from the processing circuitry to/from which data is conveyed). The mode signals, Tx Mode and Rx Mode, may be asserted exclusive of one another. When the Tx Mode signal is asserted to invoke the transmit mode, control circuit 220 may cause switches S1 and S2 to close, while holding switch S3 as open (thus isolating the remainder of receiver 204 from signal node 207). When the Rx Mode signal is asserted to invoke the receive mode, control circuit 220 may cause switch S3 to close while holding switches S1 and S2 open (thereby removing power from transmitter 202). As noted above, some embodiments of control circuit 220 are contemplated in which a third, idle mode is possible in which neither the Tx Mode nor Rx Mode signals are asserted, with control circuit causing switches S1, S2, and S3 to be open concurrent with one another.

Filter 210 in the embodiments shown is a 4th order passive LC filter. Generally speaking, filter 210 may be any suitable order filter, and may be implemented in any suitable circuit configuration. In this example, the $4^{th}$ order passive LC filter functions as a low pass filter, rejecting high frequency noise in an effort to prevent undesired emissions from transmitter 202 and to prevent external emissions from blocking signals incoming to receiver 204. Filter 210 as shown in FIG. 2 is implemented using inductors L1 and L2, and capacitors C1 and C2. The capacitors in this embodiment are variable capacitors, and thus their capacitance can be varied in accordance with a desired filter response. With regard to the response, filter 210 provides a reciprocal response for both the transmit and receive modes, e.g., the frequency response is equivalent for both modes.

In addition to the prevention of emissions by transmitter 202 and preventing external interference from blocking data incoming to receiver 204, filter 210 may also provide termination of transmission line 115. In this particular example, the termination may be provided via the choice of inductors L1 and L2 based on their DC resistance values. These values may be chosen such that the total resistance of inductors L1 and L2 is equivalent to an impedance of transmission line 115. Accordingly, the proper termination of transmission line 115 may prevent undesired reflections, while providing the same input and output impedances of receiver 204 and transmitter 202, respectively. It is noted that the mechanism for terminating transmission line 115 as discussed herein is but one of a number of possibilities, and thus this example is not intended to be limiting.

Figure 3:
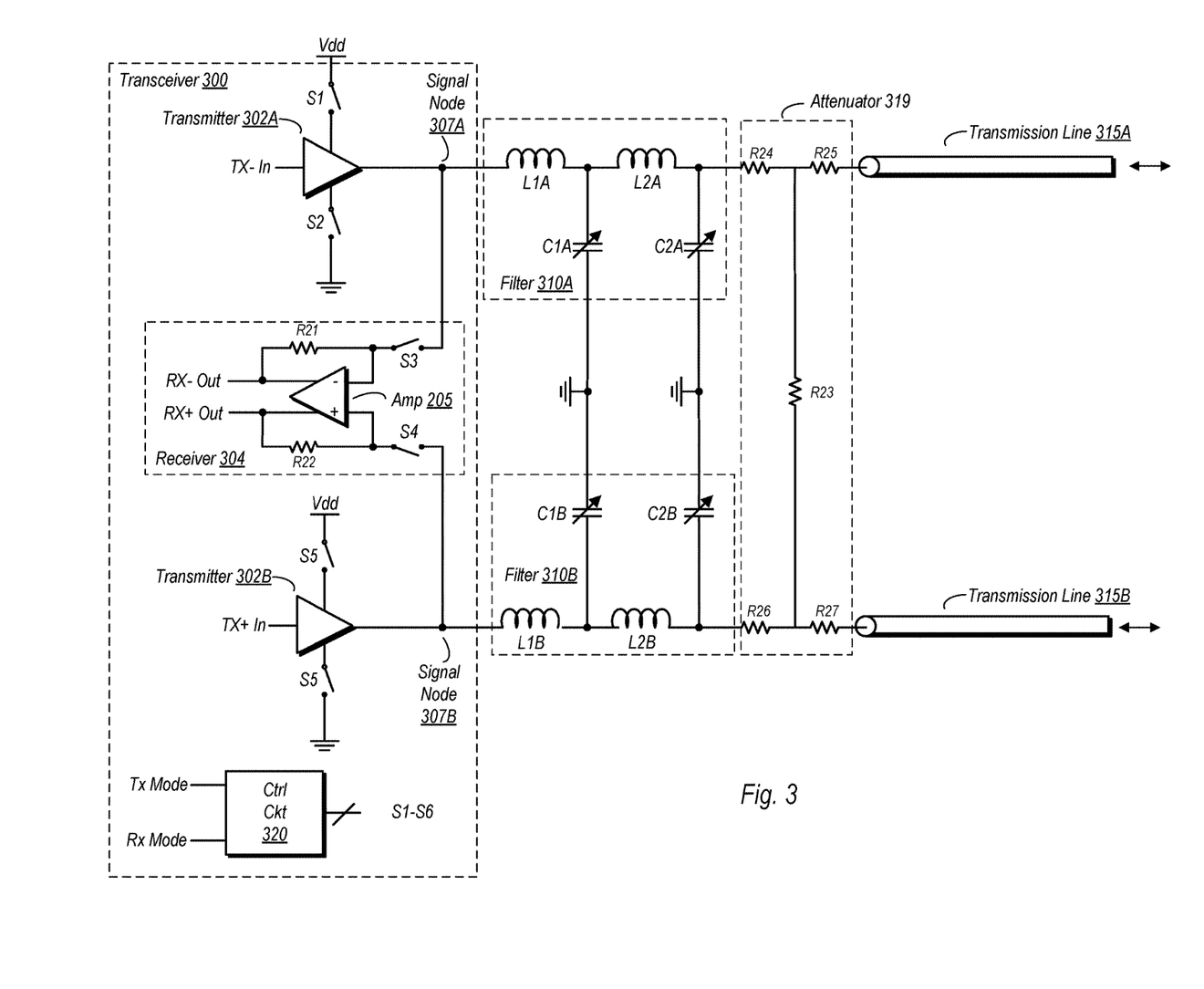
FIG. 3 is a schematic diagram of another embodiment of a transceiver.

FIG. 3 is another embodiment of a transceiver according to the disclosure. In this particular embodiment, transceiver 300 is a differential transceiver. Transceiver 300 includes two separate transmitters, transmitter 302A and 302B for signals to be transmitted on transmission lines 315A and 315B, respectively. Transmitter 302A may be enabled by closing switches S1 and S2, while transmitter 302B may be enables by closing switches S5 and S6. Inputs Tx− In and Tx+ In are coupled to transmitters 302A and 302B, respectively, to provide the components of the differential signals to be transmitted. The outputs of transmitters 302A and 302B are directly coupled to signals nodes 307A and 307B.

In receiver 302 of the illustrated embodiment, amplifier 205 is configured for differential operation. Switch S3 is coupled to signal node 307A, and is coupled to (when closed) convey an inverting component of an incoming differential signal to amplifier 205. Switch S4 is coupled to signal node 307B, and is coupled to, when closed, convey a non-inverting input of amplifier 205. Resistors R21 and R22 are provided here as feedback resistors between their respective input and output nodes. Amplifier 205 is coupled to provide corresponding outputs, RX+ Out and RX− Out. Although not explicitly shown here, instances of a Schmitt trigger may also be provided if desired.

The embodiment shown in FIG. 3 also includes filters 310A and 310B, which are arranged similarly to filter 210 of FIG. 2. Filter 310A includes inductors L1A and L2A, and also includes capacitors C1A and C2A. Filter 310B includes inductors L1B and L2B, and also includes capacitors C1B and C2B. These filters may operate in the same manner as described above with reference to filter 210, providing a reciprocal response in both the transmit and receive modes. Additionally, filter 310A and 310B may also provide, or contribute to, the termination of their respectively coupled ones of transmission lines 315A and 315B.

The embodiment shown in FIG. 3 also includes an attenuator 319 coupled between the ends of transmission line 315A and 315B. Attenuator 319 includes resistors R24 and R25 in series between filter 310A and transmission line 315A. Resistors R26 and R27 are coupled in series between filter 310B and transmission line 315B. These series resistances may be factored in with regard to the termination of their respectively coupled transmission lines. Thus, the selection of DC resistances of the inductors in filters 310A and 310B may be take these resistances into consideration to arrive at the proper termination. Another resistor, R23, is coupled between the two signal paths, more particularly between the junction of R24 and R24 and the junction of R26 and R27. Attenuator 319 provides attenuation of the differential signal swing between the two signal paths.

The differential operation provided by the embodiment of FIG. 3 may result in a further reduction of the emissions provided during operation in the transmit mode. This may be accomplished by both the operation of filters 310A and 310B, as well as by the presence of attenuator 319. Furthermore, this embodiment may be insensitive to transmit-receive common mode mismatch. Therefore, due to the common mode rejection of external noise, in combination with the reciprocal filtering, the embodiment shown in FIG. 3 may exhibit a high insensitivity to external interference.

Figure 4:
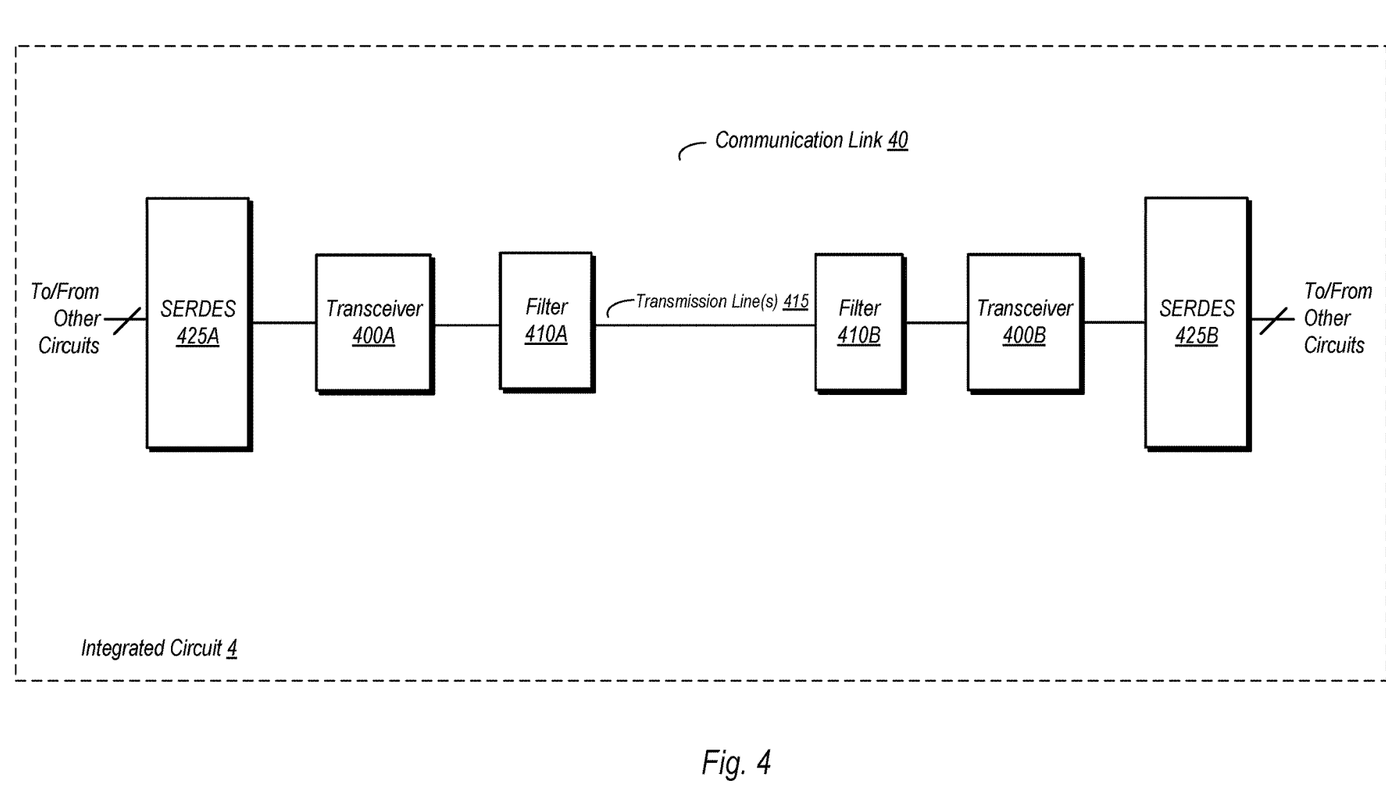
FIG. 4 is a block diagram of one embodiment of a communications link implemented in an integrated circuit.

Communications Link:

FIG. 4 is a block diagram of one embodiment of a communications link implemented in an integrated circuit. Communications link 40 in the embodiment shown may be a single-ended or differential communications link. Furthermore, communications link may implement various embodiments of the transceiver circuits discussed above, along with their respective reciprocal filters and, in differential embodiment, attenuator circuits.

As shown in FIG. 4, communications link 40, implemented on integrated circuit 4, includes a transmission line 415 upon which information may be conveyed. Although transmission line 415 is depicted as a single-ended transmission line here, it will be readily apparent to those skilled in the art that communications link 40 can be extended to differential embodiments.

Filters 410A and 410B are coupled to opposite ends of transmission line 415. These filters may correspond to one of the various filter embodiments discussed above. Such embodiments include $N^{th}$ order filters (where N is an integer value), and may further be passive filters implemented with, e.g., inductors and capacitors. Filter 410A is coupled between transceiver 400A and transmission line 415, while filter 410B is coupled between transmission line 415 and transceiver 400B. These transceivers may be configured in a manner similar to those discussed above. Furthermore, their respectively coupled filters may provide a reciprocal (e.g., equivalent) response in both transmit and receive modes). In the embodiment shown, one of the transceivers 400A and 400B may be in the transmit mode while the other is in the receive mode, and the modes may be switched between the two to change the direction of information flow. As also discussed above, embodiments are possible and contemplated where the transceivers are in an idle mode when no information is to be conveyed across the link. In various embodiments, transceivers 400A and 400B are configured for non-return to zero (NRZ) operation. Furthermore, in differential embodiments, attenuators, such as that shown in FIG. 3, may also be implemented to provide reduction of the signal swing between the differential transmission lines.

In this particular embodiments, a SERDES (serializer-deserializer) 425A is coupled to transceiver 400A, while SERDES 425B is coupled to transceiver 400B. It is noted that the SERDES example shown here is but one of a number of different possibilities of circuits coupled to the transceivers, and is thus not intended to be limiting. Among the functions performed by each SERDES is the conversion of data between parallel and serial data streams. For data to be transmitted, a given one of SERDES 425A and 425B may convert data received as parallel data from other circuits into a serial data stream to be transmitted across communications link 40. At the other end of the link, the other one of SERDES 425A and 425B may receive the serial data stream and convert it back into parallel data and subsequently convey it to other circuits. Other functions performed by each of SERDES 425A and 425B may include generation of control signals to be provided to a corresponding control circuit. In some embodiments, SERDES 425A and 425 may include direct connections to one another, apart from communications link 40, for conveying control information (e.g., indicating an impending transmission of data so that each of SERDES 425A and 425B are set to operate in a corresponding mode).

Figure 5:
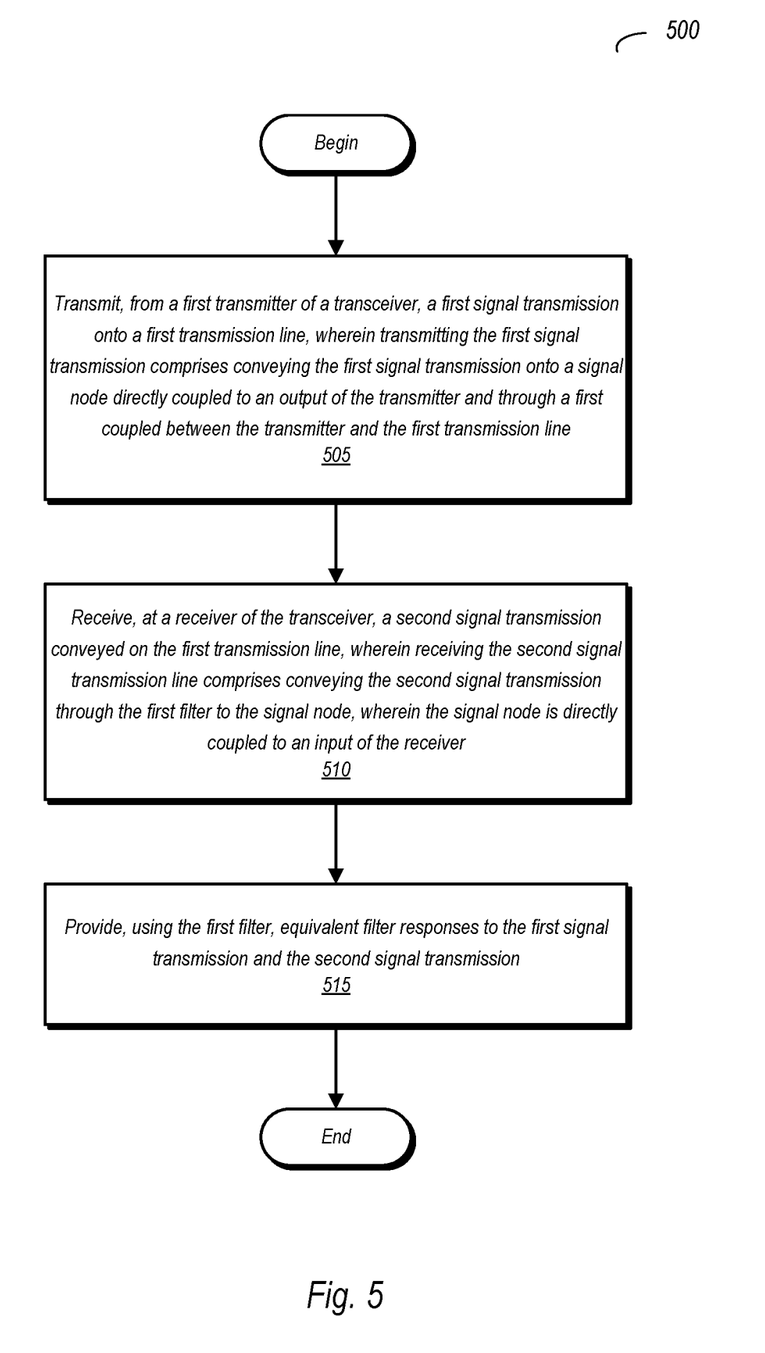
FIG. 5 is a flow diagram illustrating one embodiment of a method for operating a transceiver.

Method Flow Diagram:

FIG. 5 is a flow diagram illustrating one embodiment of a method for operating a transceiver. Method 500 in the embodiment shown may be performed using various ones of the apparatus embodiments discussed above. Embodiments of apparatus capable of carrying out Method 500, but not explicitly disclosed herein, may also fall within the scope of this disclosure. It is further noted that FIG. 5 is not intended to specify any particular order of events, but rather, illustrate those that may occur as the method is carried out.

Method 500 includes transmitting, from a first transmitter of a transceiver, a first signal transmission onto a first transmission line, wherein transmitting the first signal transmission comprises conveying the first signal transmission onto a signal node directly coupled to an output of the transmitter and through a first coupled between the transmitter and the first transmission line (block 505). The method further includes receiving, at a receiver of the transceiver, a second signal transmission conveyed on the first transmission line, wherein receiving the second signal transmission line comprises conveying the second signal transmission through the first filter to the signal node, wherein the signal node is directly coupled to an input of the receiver (block 510). The method includes providing, using the first filter, equivalent filter responses to the first signal transmission and the second signal transmission (block 515).

In various embodiments, the first filter is an $N^{th}$ order filter, and wherein the method further comprises the $N^{th}$ order filter providing resistive termination of the first transmission line.

In some embodiments, the transceiver is a single-ended transceiver. In other embodiments, the transceiver is a differential transceiver. In embodiments where the transceiver is a differential transceiver, the method further comprises transmitting, from a second transmitter of a transceiver, a third signal transmission onto a second transmission line, wherein transmitting the second signal transmission comprises conveying the first signal transmission through a second filter coupled between the second transmitter and the second transmission line. Embodiments in which the receiver is a differential transceiver further include receiving, at the receiver and via the second filter, a fourth signal transmission, wherein the second filter is shared by the second transmitter and the receiver. When carried out in an embodiment including a differential transceiver, the method further includes attenuating a differential signal swing using an attenuator coupled between the first and second transmission lines.

In various ones of the embodiments (single-ended or differential), the filter is an $N^{th}$ order passive LC (inductive-capacitive) filter. However, other types of filters are possible and contemplated.

Figure 6:
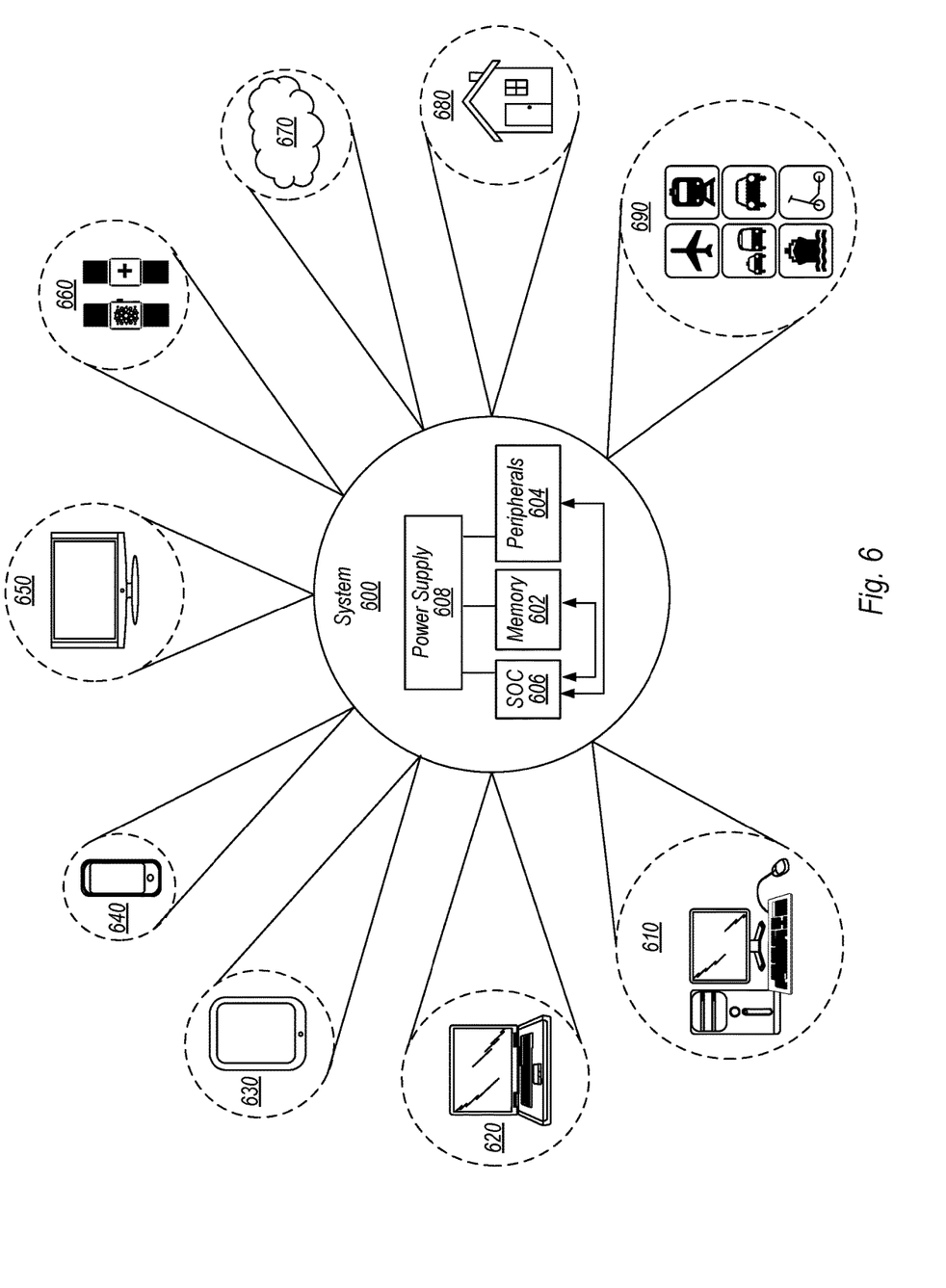
FIG. 6 is a block diagram of one embodiment of an example system.

Example System:

Turning next to FIG. 6, a block diagram of one embodiment of a system 600 is shown that may incorporate and/or otherwise utilize the methods and mechanisms described herein. In the illustrated embodiment, the system 600 includes at least one instance of a system on chip (SoC) 606 which may include multiple types of processing units, such as a central processing unit (CPU), a graphics processing unit (GPU), or otherwise, a communication fabric, and interfaces to memories and input/output devices. In some embodiments, one or more processors in SoC 606 includes multiple execution lanes and an instruction issue queue. In various embodiments, SoC 606 is coupled to external memory 602, peripherals 604, and power supply 608.

A power supply 608 is also provided which supplies the supply voltages to SoC 606 as well as one or more supply voltages to the memory 602 and/or the peripherals 604. In various embodiments, power supply 608 represents a battery (e.g., a rechargeable battery in a smart phone, laptop or tablet computer, or other device). In some embodiments, more than one instance of SoC 606 is included (and more than one external memory 602 is included as well).

The memory 602 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 604 include any desired circuitry, depending on the type of system 600. For example, in one embodiment, peripherals 604 includes devices for various types of wireless communication, such as Wi-Fi, Bluetooth, cellular, global positioning system, etc. In some embodiments, the peripherals 604 also include additional storage, including RAM storage, solid state storage, or disk storage. The peripherals 604 include user interface devices such as a display screen, including touch display screens or multi-touch display screens, keyboard or other input devices, microphones, speakers, etc.

In various embodiments, system 600 may include a number of different types of communications links between functional circuit blocks. These links may be intra-chip (e.g., between two points on an integrated circuit) or inter-chip (e.g., from one integrated circuit to another). Furthermore, the links may be between, e.g., SoC 606 and various ones of peripheral 604. The links may include parallel and/or serial data paths between two points. At least one of the communications links may be configured in accordance with the various embodiments of a communications link discussed above with reference to FIGS. 1-5.

As illustrated, system 600 is shown to have application in a wide range of areas. For example, system 600 may be utilized as part of the chips, circuitry, components, etc., of a desktop computer 610, laptop computer 620, tablet computer 630, cellular or mobile phone 640, or television 650 (or set-top box coupled to a television). Also illustrated is a smartwatch and health monitoring device 660. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 600 may further be used as part of a cloud-based service(s) 670. For example, the previously mentioned devices, and/or other devices, may access computing resources in the cloud (i.e., remotely located hardware and/or software resources). Still further, system 600 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 600 to various modes of transportation. For example, system 600 may be used in the control and/or entertainment systems of aircraft, trains, buses, cars for hire, private automobiles, waterborne vessels from private boats to cruise liners, scooters (for rent or owned), and so on. In various cases, system 600 may be used to provide automated guidance (e.g., self-driving vehicles), general systems control, and otherwise. These any many other embodiments are possible and are contemplated. It is noted that the devices and applications illustrated in FIG. 6 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity]—configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable; to," An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first transmitter circuit having an output coupled to a first signal node, the transmitter configured to transmit signals during operation in a transmit mode;
   a receiver circuit having an input coupled to the first signal node, wherein the receiver circuit is configured to receive signals during operation in a receive mode;
   a first transmission line configured to convey signals in both the transmit and receive modes; and
   a first filter coupled between the first signal node and the first transmission line, wherein the first filter is configured to provide an equivalent frequency response for operation in both the transmit and receive modes.

2. The apparatus of claim 1, wherein the first transmitter circuit has an output impedance that is substantially equal to an input impedance of the receiver circuit.

3. The apparatus of claim 1, wherein the first filter is configured to provide resistive termination of the first transmission line.

4. The apparatus of claim 1, wherein the filter is an $N^{th}$ order passive filter.

5. The apparatus of claim 1, wherein the filter includes:
   two or more inductors coupled in series between the first signal node and the first transmission line; and
   two or more capacitors, wherein ones of the two or more capacitors are coupled between a terminal of a corresponding one of the two or more inductors and a ground node.

6. The apparatus of claim 5, wherein ones of the two or more capacitors are variable capacitors.

7. The apparatus of claim 1, further comprising a differential transceiver, wherein the differential transceiver includes the receiver and the first transmitter, and further includes:
   a second transmitter having a respective output coupled directly to a second signal node, wherein the second transmitter is configured to transmit signals onto the second signal node associated with a second transmission line; and a second filter coupled to the second signal node, wherein the second filter is shared by the second transmitter and the receiver, wherein the receiver is a differential receiver.

8. The apparatus of claim 7, wherein the second filter is an $N^{th}$ order passive filter configured to provide the equivalent frequency response for operation in both the transmit and receive modes.

9. The apparatus of claim 1, wherein the receiver comprises an amplifier circuit having at least one input coupled to the first signal node, and further comprises a Schmitt trigger coupled to an output of the amplifier.

10. The apparatus of claim 1, further comprising a SERDES (serializer-deserializer) circuit coupled an output of the receiver.

11. A method comprising:
transmitting signals, using a first transmitter circuit during operation in a transmit mode, transmit signals from an output of the first transmitter circuit coupled to a first signal node;
receiving signals, using a receiver circuit during operation in a receive mode, receive signals at an input of the receiver circuit from the first signal node;
conveying, on a first transmission line during operation in the transmit mode, the transmit signals;
conveying, on the first transmission line during operation in the receive mode, the receive signals; and
filtering transmit and receive signals, using a first filter coupled between the first signal node and the transmission line, during operation in the transmit and receive modes, respectively, wherein the filtering comprises providing an equivalent frequency response in both the transmit and receive modes.

12. The method of claim 11, further comprising:
transmitting signals, using a second transmitter circuit during operation in a transmit mode, transmit signals from an output of a second transmitter circuit coupled to a second signal node, wherein the first and second transmitter circuits comprise a differential transmitter circuit;
conveying, during operation in the transmit mode, a first component of a differential transmit signal on the first transmission line and a second component of a differential transmit signal on a second transmission line; and
filtering the first and second components of the differential transmit signal using the first filter and a second filter, respectively.

13. The method of claim 12, further comprising:
filtering first and second components of a differential receive signal received via the first and second transmission lines, respectively, when operating in a receiver mode; and
providing the first and second components of the differential receive signal to the receiver circuit;
wherein filtering using the second filter comprises providing an equivalent frequency response in both the transmit and receive modes.

14. The method of claim 13, further comprising attenuating, using an attenuator, a differential signal swing between the first and second transmission lines.

15. The method of claim 12, wherein the filtering comprises filtering the first and second components of the differential transmit signal using an $N^{th}$ order LC (inductive-capacitive) filter.

16. The method of claim 12, further comprising resistively terminating the first and second transmission lines.

17. A system comprising:
a differential transceiver coupled to first end of a communications link, wherein the differential transceiver includes:
a first transmitter configured to transmit a first component of a differential transmit signal during operation in a transmit mode;
a second transmitter configured to transmit a second component of the differential transmit signal during operation in the transmit mode; and
a receiver configured to receive first and second components of a differential receive signal in a receive mode; and
a differential filter including a first passive filter coupled between the differential transceiver and a first transmission line and a second passive filter coupled between the differential transceiver and a second transmission line, wherein the differential filter is configured to provide an equivalent frequency response to differential transmit signals and differential receive signals.

18. The system of claim 17, wherein the differential filter is an $N^{th}$ order LC (inductive-capacitive) filter.

19. The system of claim 17, wherein the first and second transmitter have respective output impedances that are substantially equal to an input impedance of the receiver.

20. The system of claim 17, wherein the differential filter is configured to provide resistive termination of the first and second transmission lines.

* * * * *